(12) United States Patent
Decker et al.

(10) Patent No.: US 6,882,452 B2
(45) Date of Patent: Apr. 19, 2005

(54) PATTERNED DEPOSITION OF REFRACTIVE LAYERS FOR HIGH SECURITY HOLOGRAMS

(75) Inventors: Wolfgang Decker, Wakefield, RI (US); Shawn Early, Cranston, RI (US); Jaimy Mauricio, Newport, RI (US); Arthur Eric Bartholomay, Coventry, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 0 days.

(21) Appl. No.: 10/609,677

(22) Filed: Jul. 1, 2003

(65) Prior Publication Data

US 2004/0070803 A1 Apr. 15, 2004

Related U.S. Application Data

(60) Provisional application No. 60/392,262, filed on Jul. 1, 2002.

(51) Int. Cl.[7] ................................. G03H 1/00
(52) U.S. Cl. .............................. 359/2; 430/10; 283/72; 283/86
(58) Field of Search ........................ 359/2, 566; 430/10; 283/72, 85, 86

(56) References Cited

U.S. PATENT DOCUMENTS

| 4,856,857 A | * | 8/1989 | Takeuchi et al. ................ 359/3 |
| 5,200,253 A | * | 4/1993 | Yamaguchi et al. ...... 428/195.1 |
| 5,513,019 A | | 4/1996 | Cueli |

FOREIGN PATENT DOCUMENTS

| WO | WO 02/00446 | 1/2002 |

* cited by examiner

*Primary Examiner*—Leonidas Boutsikaris
(74) *Attorney, Agent, or Firm*—Morrison & Foerster LLP

(57) ABSTRACT

This invention relates to the production of holographic devices. The holographic devices include a transparent high refractive coating that is applied selectively to provide additional security and moisture resistance.

18 Claims, 3 Drawing Sheets

PATTERNED DEPOSITION OF REFRACTIVE LAYERS FOR HIGH SECURITY HOLOGRAMS

FIELD OF INVENTION

The present invention relates to the production of holographic devices. More particularly, the present invention relates to holographic devices and methods of making holographic devices that include a transparent high refractive coating that is applied selectively.

BACKGROUND OF THE INVENTION

Holograms have come into wide usage as decorative indicia due to their unique visual appearance. In addition, the difficulty in making and reproducing holograms has made them a common authentication feature on items like credit cards, driver's licenses and access cards. Holograms have also been used as security features on high end products, making it harder to counterfeit these products.

The most common method of creating a hologram is to create a grating pattern in a surface so that particular structures become visible upon diffraction of light in the grating. U.S. Pat. No. 3,578,845 to Brooks et al. describes how diffraction gratings are typically generated. Currently, the most common way to generate holograms based on diffraction patterns is to emboss the diffraction patterns into a thermo-formable substrate such as an embossable polymer film. In order to enhance the reflectance in the grating, a high reflective material such as aluminum is typically deposited onto the grating.

To add to the complexity of holographic identifiers, it is desirable to maximize the size of the hologram. The use of an opaque metal layer as a reflectance enhancement layer, however, can limit the size of a hologram as an identifier. If the hologram starts to overlie information located behind the hologram, the opaque metal layer can block out the information below the hologram. U.S. Pat. Nos. 5,142,383 and 5,145,212 to Malik offer one solution to this problem. Malik discloses the deposition of a discontinuous reflective metal, where small coated and uncoated areas exist next to each. The coated areas are large enough to create enough reflectance for the grating, but are small enough to be seen as a uniform coating by the unaided human eye. In addition, the non-coated areas are also large enough to allow the information behind the holographic image to be readable, but small enough and close enough to appear uniform to the unaided human eye. The combination of both effects creates a semi-transparent layer that allows the hologram to be visible while at the same time allowing the information behind the hologram to be readable.

U.S. Pat. No. 4,856,857 to Takeuchi et al. discloses different methods to achieve semi-transparency. One method is to apply a layer of metal like aluminum with a thickness of less than 200 Angstroms. According to Takeuchi et al., at these thickness the reflective metal layer still has transparency. Another method of achieving semi-transparency of the reflective layer is to deposit a transparent material layer with a refractive index different than the hologram bearing substrate. The required difference in the refractive index as claimed by Takeuchi et al. is larger than 0.2.

Typical materials for transparent reflection enhancing layers are certain oxides such as $WO_3$, $SiO$, $TiO_2$, $Al_2O_3$ or $Fe_2O_3$ and ceramic materials such as $ZnS$. Currently, the use of $ZnS$ as a transparent reflection enhancement layer in transparent holograms is the most widely used technology. Mixtures of materials disclosed by Takeuchi et al. are used as well. U.S. Pat. No. 5,513,019 to Cueli discloses mixtures of zinc sulfide (ZnS) and tungsten-oxide ($WO_3$) for holograms.

U.S. Pat. Nos. 5,757,521 and 5,789,910 to Walters et al. discuss the patterned deposition of metal to achieve local transparency through holograms. The pattern also incorporates resonant structures that can be used to identify the structure with appropriate instruments.

Common to the procedures for applying a thin reflection enhancing material layer behind the embossed diffractive pattern is the use of a vacuum vapor deposition technique. In the vapor deposition techniques, the coating material is evaporated at low pressure, typically in the $1 \times 10^{-5}$ Torr region, at elevated temperature. By passing the substrate through the vapor, the evaporated material condenses on the embossed substrate surface creating a thin layer of reflection enhancing material. The thickness of the deposited layer depends on several factors, for example, evaporation rate, vapor pressure and dwell time of the substrate in the vapor cloud.

Diffractive grating holograms achieve their high level of security partly due to the difficulty of producing original or distinct holographic patterns. However, the difficulty of producing original holograms can be a disadvantage if certain levels of variation in the holographic pattern are desired to generate discernable features in a small number of holograms. Also, although transparent holograms provide a high level of security by allowing larger and more complex holographic structures on identification articles, the most commonly used high refractive index material, zinc sulfide, is water-soluble. This can create a problem in many applications, for example, a driver's license, may be exposed to water (washing machines) by accident. This exposure can lead to dissolution of the ZnS and the loss of the holographic feature.

SUMMARY OF THE INVENTION

This invention includes devices and methods of making holographic devices. The holographic devices include a transparent high refractive coating that is applied selectively.

In one embodiment, the method of making a holographic device includes providing a transparent substrate comprising a holographic image. A patterned coating is applied to the substrate surface containing the holographic image. A high refractive index material is deposited on the substrate surface containing the patterned coating. The patterned coating prevents the high refractive index coating from attaching to the substrate surface where the patterned coating is applied. Preferably, the transparent substrate is attached to a base.

Preferably the patterned coating is removed. Preferably, the high refractive index material is zinc sulfide. Preferably, the zinc sulfide material is deposited with a thickness of 200 Angstroms to 2500 Angstroms. Preferably, the patterned coating is applied in a pattern that defines a border and the refractive index material is deposited on the transparent substrate inside the border. Preferably, the transparent substrate is attached to a base using an adhesive that has a refractive index that is within 0.2 of the refractive index of the transparent substrate.

Preferably, the holographic device is used for security purposes. Preferably, the high refractive index material is deposited by vacuum deposition. Preferably, the patterned coating is applied in a pattern that comprises letters, figures or numbers.

In another embodiment, the holographic device includes a transparent substrate having a holographic image and a patterned high refractive index material on the surface of the transparent substrate that contains the holographic image. The patterned high refractive index material is in a pattern that defines letters, figures or numbers. Preferably, the holographic device includes a base layer and an adhesive layer that binds the base layer to the transparent substrate.

In yet another embodiment the holographic device includes a transparent substrate comprising a holographic image and a patterned high refractive index material on the surface of the transparent substrate that contains the holographic image. The transparent substrate has a border and the patterned high refractive index material is located inside of the border. Preferably, the holographic device includes a base layer and an adhesive layer that binds the base layer to the transparent substrate.

BRIEF DESCRIPTION OF THE DRAWINGS

The invention will be better understood by reference to the Detailed Description of the Invention when taken together with the attached Figures, wherein.

DETAILED DESCRIPTION OF THE INVENTION

The invention includes holographic devices and methods of making holographic devices, more specifically, the invention includes holographic devices used for security and decorative purposes that provide an additional level of security, an additional level of variability and/or a higher resistance against moisture. The holographic devices include a transparent high refractive index coating that is applied in a defined pattern.

In one embodiment, a diffractive grating that can be a uniform grating such as what is commonly referred to as a "rainbow" grating is applied to a polymer substrate by embossing the grating into the surface of the substrate. The transparent high refractive index coating is applied in a defined pattern on top of the grating. Subsequent processing, such as application of a heat or pressure sensitive adhesive, covers the complete areas including those areas that are coated with the high refractive index coating and those areas that are not coated with a high refractive index coating. The refractive index of the adhesive is preferably about the same as the embossed substrate, which causes the elimination of the diffractive effect in those areas that are not coated with a high refractive index coating.

Preferably the high reflection index coating is made from zinc sulfide (ZnS) that is applied in a vacuum coating process. The preferred thickness of the zinc sulfide coating is in the range of about 200 Angstrom to about 2500 Angstrom. The preferred method of applying the defined pattern of the zinc sulfide is to apply a material to the non-coated areas that prevents the deposition of zinc sulfide in these areas, yet does not pose any problem for subsequent processing. The choice of material for the deposition prevention is preferably chosen to not react with the zinc sulfide. A material that reacts with the zinc sulfide can cause the zinc sulfide to decompose and can cause unwanted deposition of metallic zinc, which lacks transparency. The applied pattern can contain features that add a level of security to the holographic device, such as alpha-numeric shapes.

In another embodiment, the application of the pattern is used to improve moisture resistance for laminated security holograms. The laminated holograms can be used on identification cards such as driver's licenses. The applied pattern provides frame like areas that are not coated with the high refractive index material such as zinc sulfide. The moisture driven corrosion of the high refractive index materials typically starts from the edges of the laminated sheet. An area without the corrosion sensitive high refractive index coating at the edges of the laminate provides an improved moisture barrier and reduces the corrosion and degradation of the high refractive index material.

Figure 1:
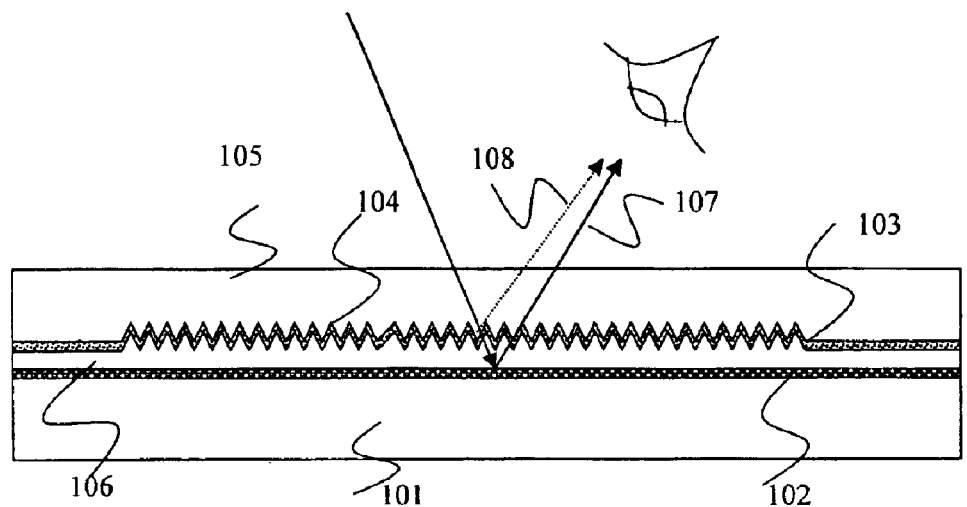
FIG. 1 is a cross section of a security device using diffractive gratings in accordance with the invention.

FIG. 1 depicts a cross sectional view of an identity card prepared in accordance with this invention. A base 101, preferably made from polyvinyl chloride (PVC), carries printed information 102. A transparent substrate 105 is adhered to the base. The transparent substrate incorporates a holographic structure having a diffractive micro-grating 104. Semitransparent holographic image 108 overlays over printed image 107. An adhesive 106 is used to bind the base substrate 101 to the transparent structure 105. The adhesive 106 preferably has a refractive index which is about the same as the micro-grated substrate. Preferably the refractive indices are within 0.2, more preferably within 0.15, most preferably within 0.1.

In order to achieve the diffracting effect within the grating, preferably there is a difference between the refractive index of the micro-grating and any subsequent layer. Preferably, the difference is at least 0.2, more preferably at least 0.5, most preferably at least 0.7. This difference can be achieved by applying a thin layer of high refractive index material 103 on the micro-grated surface.

Figure 2:
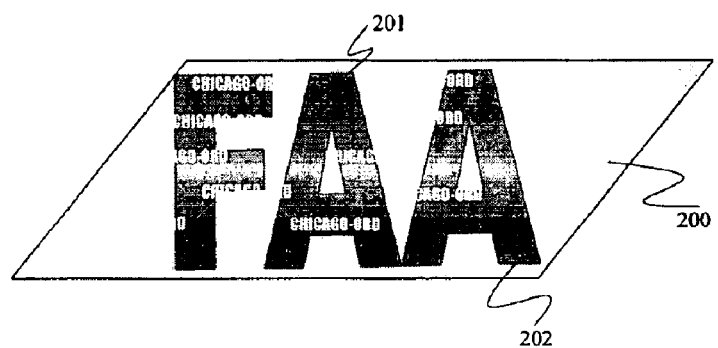
FIG. 2 is a vacuum coating device for the production of thin film high refractive index coatings that includes a device for the application of a pattern in accordance with the invention.

In one embodiment, there are areas that purposely are not covered with high refractive index material. As previously stated, the close match of the refractive indices between the adhesive and the substrate carrying the diffractive grating minimizes diffraction at the interface. This makes it difficult to detect any holographic effect in these areas. FIG. 2 shows an example of this embodiment. In FIG. 2 holographic information exhibits the letters "FAA" based on a rainbow color diffraction pattern 202. A pattern exhibiting the letters CHICAGO-ORD has been imposed on the substrate carrying the holographic structure so that deposition of the high refractive index material was prevented in these areas 201. When this structure is laminated to the ID card, the non-coated areas become fully transparent, exposing information lying underneath, without exhibiting the holographic information.

Figure 3:
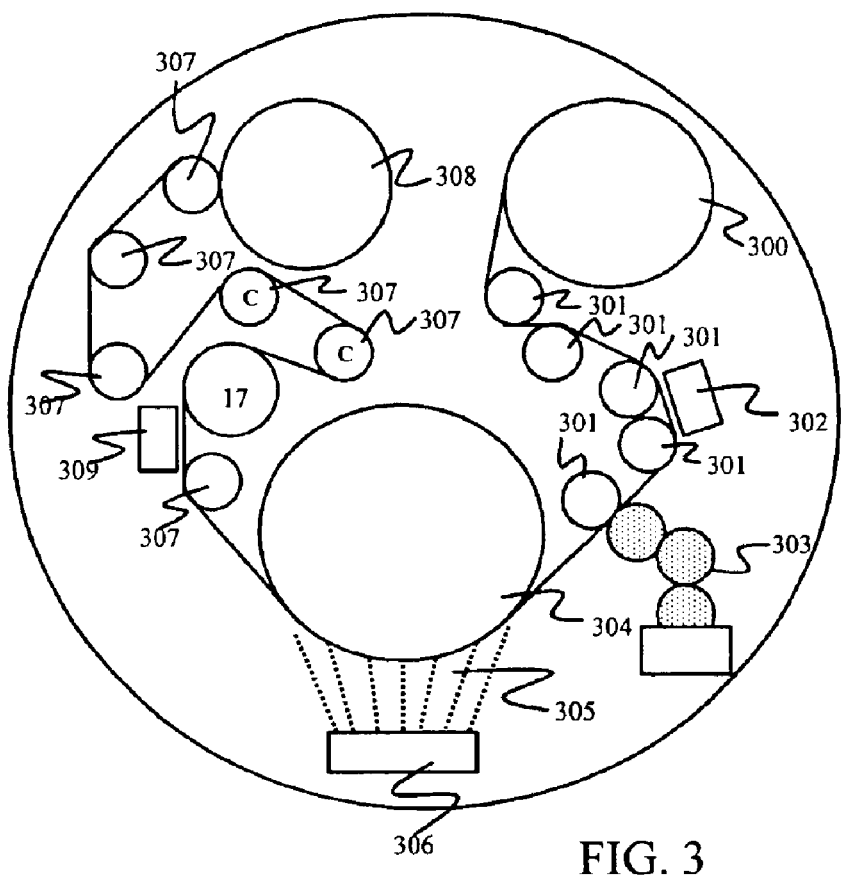
FIG. 3 is a pattern application apparatus in accordance with the invention.

The deposition of the high refractive index coating is preferably accomplished in a vacuum coating machine. A preferred machine is depicted in FIG. 3. The unwind roll 300 contains a web like substrate, which can be either pre-embossed with the diffraction grating or non-embossed for direct embossing through the high refractive index coating. The unwound substrate is preferably guided through a surface treatment process 302 using transport rollers 301. The treatment process 302 exposes the surface to a treatment with ionized gases. The substrate is then directed to evaporation roller 304. An evaporator 306 is used to apply a high refractive index material to substrate on roller 304. The evaporator 306 can be of any kind that is capable of creating a vapor cloud 305 that is sufficient to condense the preferred high refraction index material onto the surface of the film at an appropriate speed. For example, resistively heated evaporators, electron beam evaporators or sputter sources can be used. The substrate is then rewound onto rewind roll 308, using return rollers 307. Subsequent processing that is not depicted here would include embossing (in case of direct-embossable substrates), application of the adhesive, slitting, die cutting and lamination to the ID.

The generation of a pattern free of high refractive index material can be achieved by applying a coating to the surface of the substrate that prevents the deposition of the high refractive index material. Preferable patterns for the pattern free of high refractive index material include letters, numerals and figures. The coating can be applied with a printing type system 303 prior to the exposure of the surface to the evaporator 306. The deposition prevention coating can include, for example, oils which are unreactive with the reflective material.

Some preferable oils start evaporating upon exposure to the heat generated by the evaporator, thus defeating condensation of material in the areas covered by these oils. Other preferable oils have a low surface energy preventing nucleation of the evaporated high refractive index materials on the substrate surface. The method of applying the deposition prevention coating in a pattern is commonly known as "pattern metallizing" in the zinc and aluminum metallizing industries, and is used for capacitor applications.

However, the technology used in other industries cannot be simply transferred to the deposition of high refractive index materials, as interactions between the high refractive index material and the oils, particularly if the high refractive index material is zinc sulfide, may occur. Chemical interaction between the evaporated oil and the zinc sulfide can lead to decomposition of the zinc sulfide. This can result in metallic zinc being deposited on the substrate, instead of zinc sulfide, destroying the transparency of the coating. Another problem is the low evaporation temperature of the high refractive index material as well as the low substrate speed, which can change the energy level to which the applied oil pattern is exposed. This can change the evaporation behavior of the deposited oil and how easily the oil can be removed.

Preferably, the deposition prevention coating is completely removed prior to further processing, as it may interfere with some of the functions of the subsequent processes. For example, oil from the deposition prevention coating may interfere with the adhesives used in the lamination processes. Removal of the oil preferably occurs during the vapor coating process itself, since the oil may, as described above, evaporate upon exposure to the heat from the evaporator. In another embodiment, a post treatment with ionized gases 309 may remove, react or cross-link the oils to a degree that they do not interfere with the functionality of subsequent processes.

Figure 4:
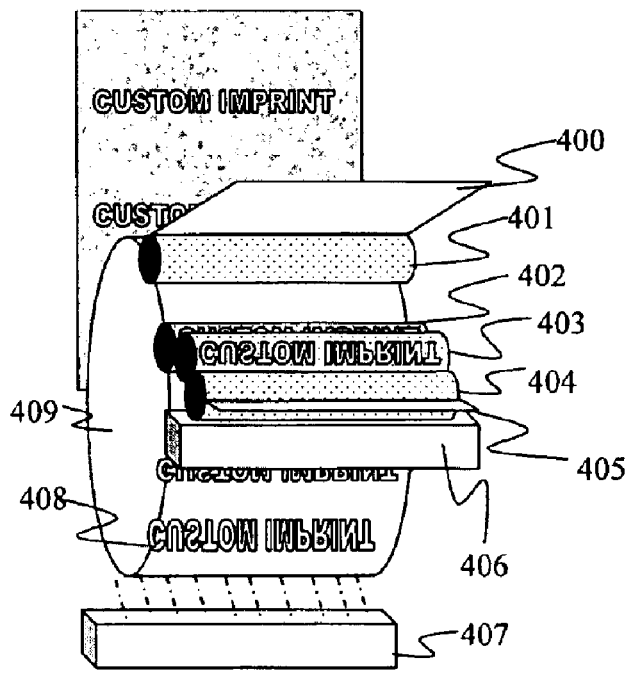
FIG. 4 is an example of a holographic device exposing an applied pattern in accordance with the invention.

FIG. 4 depicts one embodiment of an apparatus used to apply the coating that prevents deposition of the high reflective index material. A pickup roller 404 picks up oil that is used to prevent the deposition of the high refractive index material. A doctor blade 405 controls the amount of oil transported by the pickup roller 404. The oil is then transferred to the pattern roller 403 bears the pattern for the oil to be applied to the substrate 400. The pattern roller 403 transfers the oil to print roller 402. The print roller 402 in turn applies the patterned oil 408 to the web substrate 400 on coating drum 409. Evaporator 407 is then used to deposit a high refractive index coating onto substrate 400 containing the patterned oil 408. In another embodiment, the pattern roller 403 has the function of the print roller.

Using print rollers to apply a pattern to holographic areas can be used to more easily create unique holograms. Creating original holograms, and producing the embossing tools to reproduce the holograms, is generally much more complicated than the production of high end print rollers. Therefore, it is possible to use a less sophisticated diffraction pattern and add complexity to the item by applying varying patterns of non-coated areas. Further, it is possible to use a highly sophisticated pattern and still add another level of security by applying another sophisticated pattern of non deposited areas. For example, the aforementioned ID card with the FAA hologram could be customized for use at different airports by applying an airport specific pattern of non-deposited areas to the hologram. Yet another level of complexity can be achieved if the pattern of non-deposited areas exhibits a micro-structure in itself that can only be read with high magnification.

Figure 5:
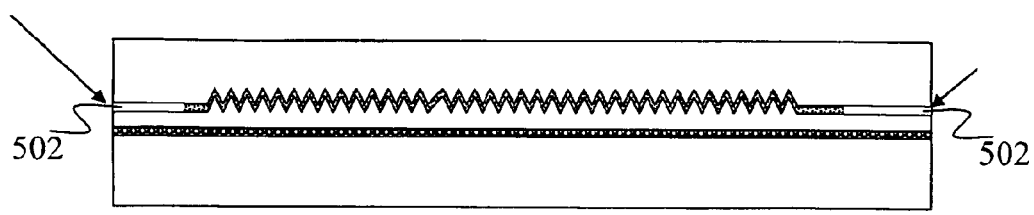
FIG. 5 is a cross sectional view of a hologram exposed to moisture in accordance with the invention.
Figure 6:
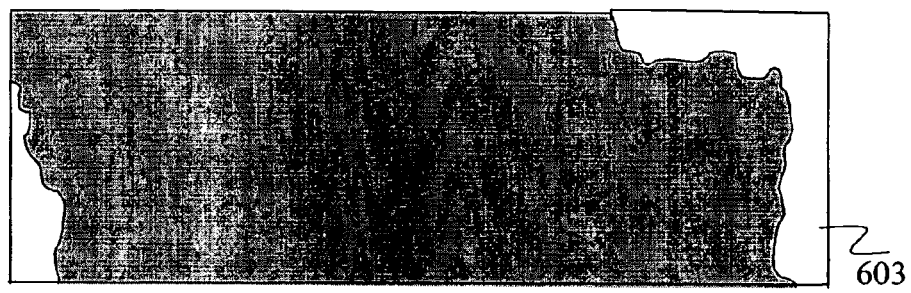
FIG. 6 is a top plan view of a hologram exposed to moisture in accordance with the invention.

Another aspect of this invention is the increased resistance to moisture corrosion of semi-transparent holograms. Zinc sulfide, which is commonly used in semi-transparent holograms, is water-soluble. Exposure of the holographic structure to increased humidity, therefore, can slowly destroy the holographic features as the zinc sulfide starts decomposing with exposure to moisture. Typically, the corrosion of the zinc sulfide starts at the edges of the laminate, as shown in FIGS. 5 and 6. FIG. 5 is a cross-sectional view of a hologram exposed to moisture. FIG. 6 is a top plan view of a hologram exposed to moisture. The zinc sulfide is most prominently exposed at the edges of the laminate, whereas in other areas the coating is better protected by the water vapor resistance of the hologram carrying substrate. Once corrosion at the edge begins, it opens a diffusion path for water vapor through which the corrosion can spread into the structure 502. A side effect of this phenomenon is delamination of the holographic structure from the carrier substrate starting at the edge where corrosion begins 603.

In an embodiment of this invention a pattern of a coating that prevents deposition of the high refractive index material is applied in a frame-like pattern. The holographic substrate is then cut in such a way that the frame-like area having no high refractive index material defines the edge of the structure being laminated to the ID card. The absence of high refractive index material on the edge of the laminate reduces the risk of corrosion and early delamination at the edges.

EXAMPLE

The following non-limiting example illustrates one embodiment of how a security device incorporating this invention is produced:

LUMBRITE™ U6-E material, manufactured by Toray Plastics (America), Inc., is a Polyethylene-Terephtalate (PET) substrate that is highly transparent and is coated with an embossable layer on one side. A heated master shim carrying a diffractive or holographic pattern on its surface is pressed onto the embossable surface, copying the surface structure of the shim onto the embossable side of the U6-E substrate. This is done in a continuous converting process, so that the embossed U6-E is rewound into a roll.

The roll of embossed U6-E material is then processed in a vacuum coating system. After creating a vacuum in the process chamber, the substrate is unwound and exposed to a surface treatment using ionized gases. A preferred gas mixture for ionization is about 80% nitrogen and about 20% oxygen; other gases or compositions can be used as well.

After the surface treatment the desired pattern is applied using a pattern printing system. The print medium is an oil that is similar to oils used in the capacitor metallization industry for the generation of margins. An example of such an oil is FT702, supplied by Fil-Tech Co., Boston, Mass.

Immediately after application of the oil pattern, the substrate passes the zinc-sulfide evaporator, where the high refractive index coating is applied. Oil covered areas stay free from zinc sulfide because the oil prevents the adherence and deposition of the zinc sulfide either due to evaporation of the oil from the surface or because of its very low surface energy. After application of the high refractive index layer, any remaining oil is removed or crosslinked so as not to interfere with any subsequent processes. Typical web speed in the vacuum coating process is around 100–150 meters per minute, depending on the substrate and the complexity of the applied pattern. Subsequent processing can include slitting, application of heat or pressure sensitive adhesive and die-cutting to appropriate size (label size). The labels are then laminated to ID-cards such as driver's licenses etc.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges and at other numerical ranges which persons skilled in the art will find this invention operable.

What is claimed is:

1. A method of making a holographic device comprising:
   providing a transparent substrate comprising a holographic image;
   applying a patterned coating on a predetermined portion of the substrate surface containing the holographic image; and
   depositing a high refractive index material to the substrate surface containing the patterned coating, wherein the patterned coating prevents the high refractive index coating from attaching where the patterned coating is applied; and
   attaching the transparent substrate to a base.

2. The method of claim 1, further comprising removing the patterned coating.

3. The method of claim 1, wherein the high refractive index material is zinc sulfide.

4. The method of claim 3, wherein the zinc sulfide material is deposited with a thickness of 200 Angstroms to 2500 Angstroms.

5. The method of claim 1, wherein the patterned coating is applied in a pattern that defines a border and wherein refractive index material is deposited on the transparent substrate inside the border.

6. The method of claim 1, wherein the transparent substrate is attached to the base using an adhesive.

7. The method of claim 6, wherein the adhesive has a refractive index that is within 0.2 of a refractive index of the transparent substrate.

8. The method of claim 1, wherein the holographic device is used for security purposes.

9. The method of claim 1, wherein the high refractive index material is deposited by vacuum deposition.

10. The method of claim 1, wherein the patterned coating is applied in a pattern that comprises letters, figures or numbers.

11. A holographic device comprising:
    a transparent substrate comprising a holographic image; and
    a high refractive index material on the surface of the transparent substrate that contains the holographic image, wherein the transparent substrate has a border comprised a coating that prevents the attachment of the high refractive index material to the border and wherein the high refractive index material is located inside of the border.

12. The holographic device of claim 11, further comprising a base layer and an adhesive layer that binds the base layer to the transparent substrate.

13. The holographic device of claim 11, wherein the high refractive index material is zinc sulfide.

14. The holographic device of claim 13, wherein the zinc sulfide material has a thickness of 200 Angstroms to 2500 Angstroms.

15. The holographic device of claim 11, wherein the high refractive index material is in a pattern that defines letters, figures or numbers.

16. The holographic device of claim 12, wherein the adhesive has a refractive index that is within 0.2 of a refractive index of the transparent substrate.

17. The holographic device of claim 11, wherein the holographic device is a security device.

18. The holographic device of claim 11, wherein the coating that prevents the attachment of the high refractive index material is removed from the holographic device.

* * * * *